(12) United States Patent
Farrell et al.

(10) Patent No.: US 11,804,981 B2
(45) Date of Patent: Oct. 31, 2023

(54) METHOD AND APPARATUS FOR PROVIDING AN INDIVIDUALLY SECURE SYSTEM TO MULTIPLE DISTRUSTING PARTIES

(71) Applicant: GM GLOBAL TECHNOLOGY OPERATIONS LLC, Detroit, MI (US)

(72) Inventors: Brian Farrell, Troy, MI (US); David M. Nairn, Plymouth, MI (US); Thomas M. Forest, Macomb, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 402 days.

(21) Appl. No.: 17/149,453

(22) Filed: Jan. 14, 2021

(65) Prior Publication Data
US 2022/0224561 A1  Jul. 14, 2022

(51) Int. Cl.
*H04L 12/40* (2006.01)
*H04L 9/08* (2006.01)

(52) U.S. Cl.
CPC ...... *H04L 12/40104* (2013.01); *H04L 9/0866* (2013.01); *H04L 9/0894* (2013.01); *H04L 2012/40215* (2013.01); *H04L 2012/40273* (2013.01); *H04L 2209/84* (2013.01)

(58) Field of Classification Search
CPC ............ H04L 12/40104; H04L 9/0866; H04L 9/0894; H04L 2012/40215; H04L 2012/40273; H04L 2209/84
USPC .......................................................... 713/168
See application file for complete search history.

(56) References Cited

U.S. PATENT DOCUMENTS

| 11,210,678 | B2 * | 12/2021 | Kim | ...................... | H04L 9/0866 |
| 11,228,421 | B1 * | 1/2022 | Mesh | ...................... | G06F 21/36 |
| 2002/0120856 | A1 * | 8/2002 | Schmidt | ................ | G06F 21/572 |
| | | | | | 713/193 |
| 2013/0111582 | A1 * | 5/2013 | Forest | ...................... | G06F 21/44 |
| | | | | | 726/19 |

* cited by examiner

*Primary Examiner* — Dereena T Cattungal
(74) *Attorney, Agent, or Firm* — Lorenz & Kopf LLP

(57) ABSTRACT

The present application relates to a method and apparatus for intelligent wireless protocol optimization including storing, in a memory, a first customer key and a second customer key, receiving, by a processor, a secret key, decrypting, by the processor, the secret key using a first customer key to extract a master key, provisioning, by the processor, an electronic control unit in response to the master key, and deleting, by the processor, the second customer key in response to the provisioning of electronic control unit in response to the master key.

19 Claims, 5 Drawing Sheets

METHOD AND APPARATUS FOR PROVIDING AN INDIVIDUALLY SECURE SYSTEM TO MULTIPLE DISTRUSTING PARTIES

BACKGROUND

The present disclosure relates generally to electronic computing systems. More specifically, aspects of this disclosure relate to systems, methods and devices to provide identical computing systems to multiple distrusting parties wherein each party utilizes a secure credential for accessing and provisioning the computing system.

Manufacturers of electronic components and electronic computing systems, such as processors, electronic control units (ECUs) and the like, often provide these systems to multiple competing parties. These systems often require secure data access to the device, secure communications between devices and the devices may contain proprietary algorithms, electronic data, and the like. Thus, these systems may require proprietary information for each of the competing parties to be installed on the system prior to delivery to each of the parties. This creates a problem in that different systems must be created for each party so that proprietary information is not distributed and/or shared among the parties. Creating individual systems for each customer results in part proliferation which increases costs associated with the system and increases supply and distribution complexity. It would be desirable to overcome these problems to provide a single part to mutually distrusting parties that protects each party's security credentials.

The above information disclosed in this background section is only for enhancement of understanding of the background of the invention and therefore it may contain information that does not form the prior art that is already known in this country to a person of ordinary skill in the art.

SUMMARY

Disclosed herein are various secure electronic systems and related control logic for provisioning secure electronic systems, methods for making and methods for operating such systems, and motor vehicles equipped with onboard secure electronic systems. By way of example, and not limitation, there is presented a computing system which may be provided to mutually distrusting parties which protects each party's security credentials by enabling a method and apparatus for secure access by each party and corresponding control systems.

In accordance with an aspect of the present disclosure, a method including storing, in a memory, a first customer key and a second customer key, receiving, by a processor, a secret key, decrypting, by the processor, the secret key using a first customer key to extract a master key, provisioning, by the processor, an electronic control unit in response to the master key, and deleting, by the processor, the second customer key in response to the provisioning of electronic control unit in response to the master key.

In accordance with another aspect of the present disclosure, wherein the first customer key and the secret key are generated in response to a unique identifier of the electronic control unit using an algorithm associated with a first customer.

In accordance with another aspect of the present disclosure, wherein the secret key is received at a controller area network interface.

In accordance with another aspect of the present disclosure, wherein the second customer key is associated with a second customer.

In accordance with another aspect of the present disclosure, wherein a further provisioning of the electronic control unit is performed in response to a confirmation, by the processor, of the deletion of the second customer key.

In accordance with another aspect of the present disclosure, wherein the processor is further configured to allow provisioning of a security credential for use by the electronic control unit in response to the master key.

In accordance with another aspect of the present disclosure, wherein the master key is a first security credential associated with a first customer.

In accordance with another aspect of the present disclosure, wherein the first customer key and the second customer key are generated by a supplier of the electronic control unit in response to the unique identifier of the electronic control unit and are stored in the memory by the supplier.

In accordance with another aspect of the present disclosure, further operative for receiving a default unlock key associated with a first customer and wherein the processor is further configured for altering the first customer key in response to receiving the default unlock key.

In accordance with another aspect of the present disclosure, a secure controller including a memory configured for storing a first key and a first data associated with a first customer and a second key and a second data associated with a second customer, an interface receiving a received key, and a processor for decrypting the received key in response the first key to generate a master key, for provisioning an electronic control unit in response to the master key, for deleting the second key and the second data in response to the provisioning of the electronic control unit in response to the master key.

In accordance with another aspect of the present disclosure, wherein the first key and the received key are generated in response to a unique identifier of the secure controller using an algorithm associated with the first customer.

In accordance with another aspect of the present disclosure, wherein the interface is a controller area network interface.

In accordance with another aspect of the present disclosure, wherein the second data is a control algorithm associated with an ecosystem of the second customer.

In accordance with another aspect of the present disclosure, wherein the processor is further operative to confirm the second data is deleted before allowing a further provisioning of the electronic control unit.

In accordance with another aspect of the present disclosure, wherein the processor is further configured to allow provisioning of security credentials for use by the secure controller in response to the master key.

In accordance with another aspect of the present disclosure, wherein the first data is a first security credential associated with a first customer system and wherein the second data is a second security credential associated with a second customer system.

In accordance with another aspect of the present disclosure, wherein the first key and the second key are generated by a supplier of the secure controller in response to the unique identifier of the secure controller and are stored in the memory by the supplier.

In accordance with another aspect of the present disclosure, wherein the interface is further configured for receiving a default unlock key associated with the first customer and wherein the processor is further configured for altering the first key and not altering the first data, the second data and the second key in response to receiving the default unlock key.

In accordance with another aspect of the present disclosure, a vehicle electronic control unit including a memory configured for storing a first customer key associated with a first customer, a first provisioning data associated with the first customer, a second customer key associated with a second customer and a second provisioning data associated with the second customer, a network interface configured for receiving a received key, and a processor configured to decode the received key to generate a master key, to delete the second provisioning data and the second secret key in response to the generation of the master key and for provisioning the vehicle electronic control unit in response to the master key and the first provisioning data in response to the deletion of the second provisioning data and the second secret key.

In accordance with another aspect of the present disclosure, wherein the first customer key and the received key are generated in response to a unique identifier of vehicle electronic control unit using an algorithm associated with the first customer.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
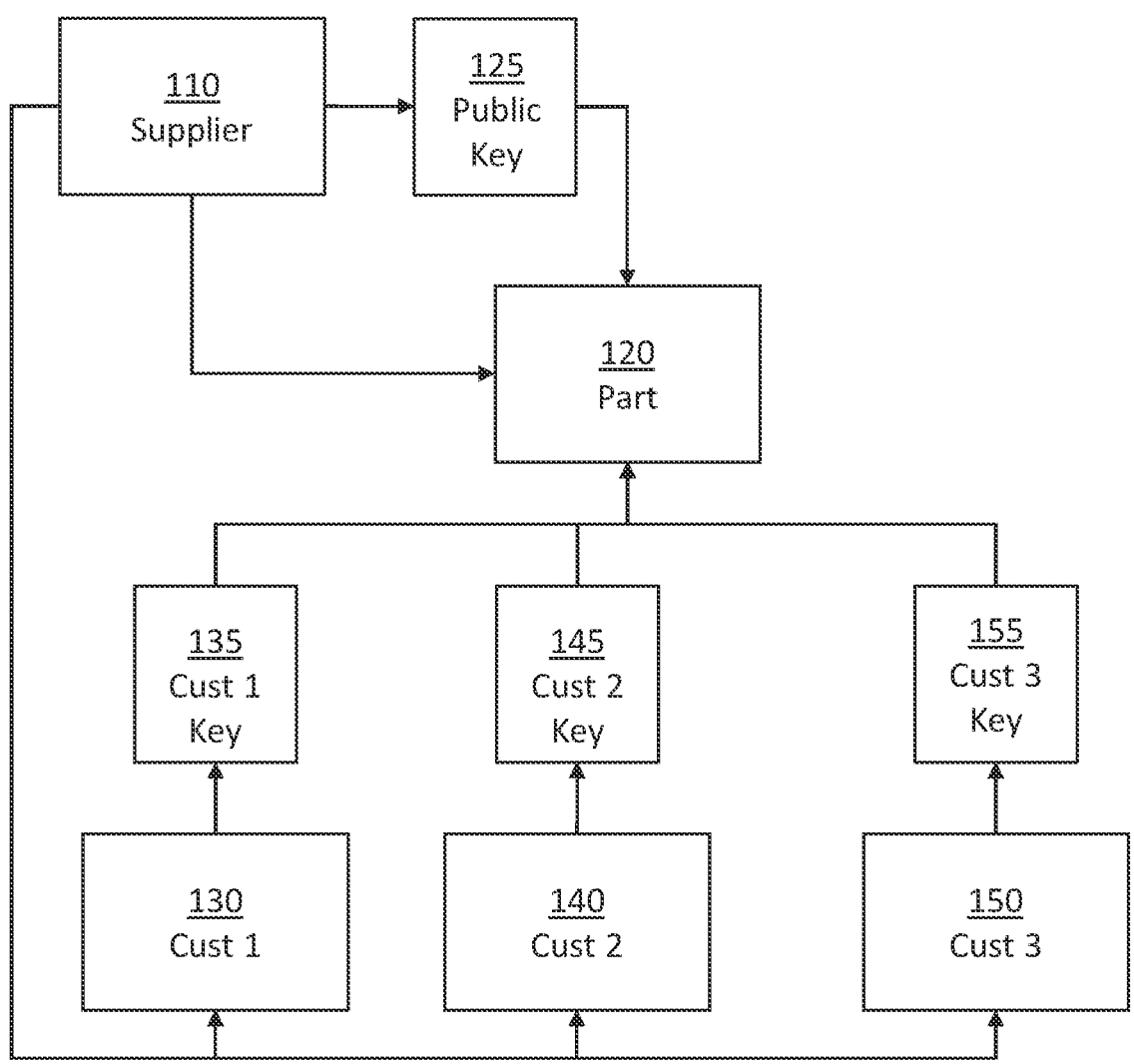
FIG. 1 shows an exemplary environment for providing an individually secure system to multiple distrusting parties according to an exemplary embodiment.

Turning now to FIG. 1, an exemplary environment 100 for providing an individually secure system to multiple parties according to an exemplary embodiment is shown. The exemplary environment 100 includes a supplier 110, a part 120, a first customer 130, a second customer 140 and a third customer 150. The environment 100 further includes a first customer key 135, a second customer key 145, a third customer key 155 and a public key 125. The disclosed system and method are configured to facilitate a part to be supplied by a trusted supplier 110 to mutually distrusting customers 130, 140, 150 that need to be able to provision security credentials for use in their ecosystem in such a way that doesn't allow the other parties to know or inappropriately use their security credentials, even if observing the provisioning.

In this exemplary embodiment, a trusted supplier 110 supplies the part 120 with a default public key 125 and a unique secret key generated for each customer 130, 140, 150, receiving the part 120. The part 120 is configured to reject software updates that could result in the part 120 being modified by a party to behave maliciously in another party's ecosystem. The part 120 is configured to not allow software updates until the part has been configured for use in a particular party's ecosystem which results in erasing the secret key and any associated data of all other parties. The unique secret key ensures that each party is able to keep their security credentials confident even if another party observes the provisioning of those security credentials.

To achieve the providing of an individually secure system to multiple parties, the supplier 110 first provides parts 120 to each of the first customer 130, second customer 140 and third customer 150, wherein each part 120 has a unique ID (UID). Each of the customers has a customer key 135, 145, 155 which is secret to only that customer. A secret key is generated for each part using the UID and the customer keys 135, 145, 155. Each party's secret key is derived from the UID using the customer keys 135, 145, 155 which ensures that each customer only knows its own secret key and does not know the secret keys of the other customers 130, 140, 150.

Each of the customers 130, 140, 150 receiving the parts 120 is able to configure the part 120 for use in their ecosystem by using the UID and their customer key 135, 145, 155, to generate the appropriate secret key in the part and provision the part with their security credentials. Another customer 130, 140, 150 receiving the part is unable to configure the part for use in another parties' ecosystem without the appropriate customer key 135, 145, 155. In addition, other customers receiving the parts 120 also are not able to determine the security credentials of other parties if they observe the part being configured, as the security credentials are encrypted with the party's customer key 135, 145, 155 that is not known by the other parties. Once the part 120 is accessed with a particular customer key 135, 145, 155, information related to other customers is then erased to prevent a party from using another party's security credentials after taking control of the part. This is achieved by not allowing a software update until all other customer keys 135, 145, 155 are erased. In one exemplary embodiment, each of the customers 130, 140, 150 is located in a different region, wherein there is a unique customer key 135, 145, 155 for each region Each part 120 is further supplied with a public key 125 for each party receiving the part 120. Since, the part 120 will not allow software updates to occur until the part 120 has been configured for use by a particular customer, the default root public keys 125 are used to transition to the customer's production root public key, but are not permitted to be used for software updates. When the production root public key is provisioned, it erases all of the other parties' secret keys prior to allowing the production root public key to be used to change the software. This prevents any party from being able to modify the software of the part and use the secret key of another customer to determine security credentials used in that customer's ecosystem or be able to put malware on a part 120 that has valid security credentials for another customer's ecosystem.

Figure 2:
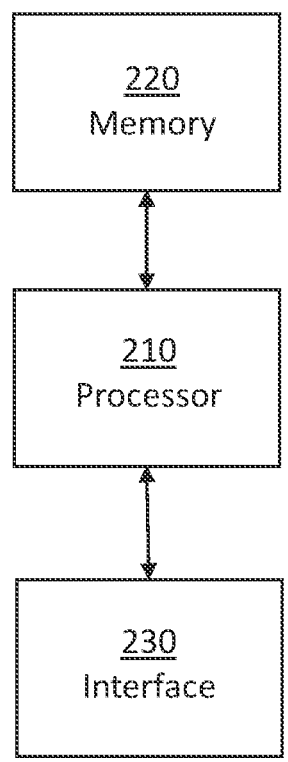
FIG. 2 shows a block diagram of a system for providing an individually secure system to multiple distrusting parties according to another exemplary embodiment.

Turning now to FIG. 2, a system 200 for providing an individually secure system to multiple parties according to an exemplary embodiment is shown. The exemplary system 200 may include a processor 210, a memory 220 and an interface 230. In this exemplary embodiment the system 200 may be a part, such as automotive electronic control unit (ECU) which is supplied by one provider to a number of independent customers, with each customer requiring a unique configuration or provisioning of the part or having proprietary software pre-installed on the system 200. These preconfigured individual customer software may include customer intellectual property and it is therefore desirable to restrict access to the individual customer software to only authorized parties. In this example, a customer key may be a provisioning key or the like used to generate a secret key in response to a master key and the provisioning key.

In this exemplary memory 220 is configured to store multiple sets of customer data. This customer data may include software algorithms, system or part provisioning data, and/or other sensitive information. In the example of an ECU, the part 200 may include special purpose-designed software in order to perform the control functions of vehicle systems, such as the powertrain, climate control system, infotainment system, body systems, chassis systems, and others. In addition, the memory 220 may include security credentials, such as a customer key for facilitating provisioning of a master key in the system 200. In this exemplary embodiment, the memory 220 may include a customer key which is unique for each customer wherein the customer key is derived in response to a part UID. Each customer key is derived from the UID using a different secret process or algorithm known only to the supplier and the intended customer. In addition, the memory 220 may include a default root public key for each party receiving the part. The default root public key may be used to transition to the customer's secret key but may not be permitted to be used for software updates.

The interface 230 may be configured to receive and transmit data between the processor 210 and an external system. In one exemplary embodiment, the interface 230 may receive a secret key from a customer intended to provide access to the part for provisioning and/or configuration by the customer. In one exemplary embodiment, the secret key is a master key encoded in response to the customer key. The interface 230 may be a network interface, such as a controller area network (CAN) bus, an ethernet port, a universal serial bus (USB) port, or a wireless network interface, such as an antenna or the like. In addition, the interface 230 may receive programming data or program update data for performing an operational algorithm for controlling external systems. The interface 230 may further receive operation data and/or error codes from the processor 210 for coupling to external diagnostic systems such as via an on-board diagnostic system interface (OBD-II) or the like.

The processor 210 is configured to receive a data from the interface 230. In response to the received data, the processor 210 may determine if the received data is a secret key or a default public key. If the data is a default public key, the processor 210 may then receive instructions related to transitioning the part to a customer secret key. However, the processor 210 may not alter data or software on the part in response to a public default key to avoid disclosure of private customer algorithms or data and/or avoid the installation of malware on the system. In one example, the received data is a master key encoded using a customer secret key. The processor 210 is configured to decode the secret key using a stored customer key to extract a master key. The processor 210 is then configured to provision the device using the master key. The processor 210 then deletes all data associated with other customers from the memory 220. Once the other customer data is deleted, the processor 210 may then configure the remaining data in the memory and/or execute stored algorithms associated with the customer in response to additional instructions received at the interface.

When the secret key is decoded by the processor 210 using the customer key to extract the master key, the processor 210 may initially provision the part by provisioning the master key in the part and erasing all of the other parties' secret keys prior to allowing the production root public key to be used to change the software. This prevents a party from being able to modify the software of the part and use the secret key of another party to determine security credentials used in that party's ecosystem or be able to put malware on a part that has valid security credentials for another party's ecosystem. The customer may generate the secret key using a key generating algorithm unique to that customer and a UID of the part. The secret key man be an alphanumeric series of digits.

Figure 3:
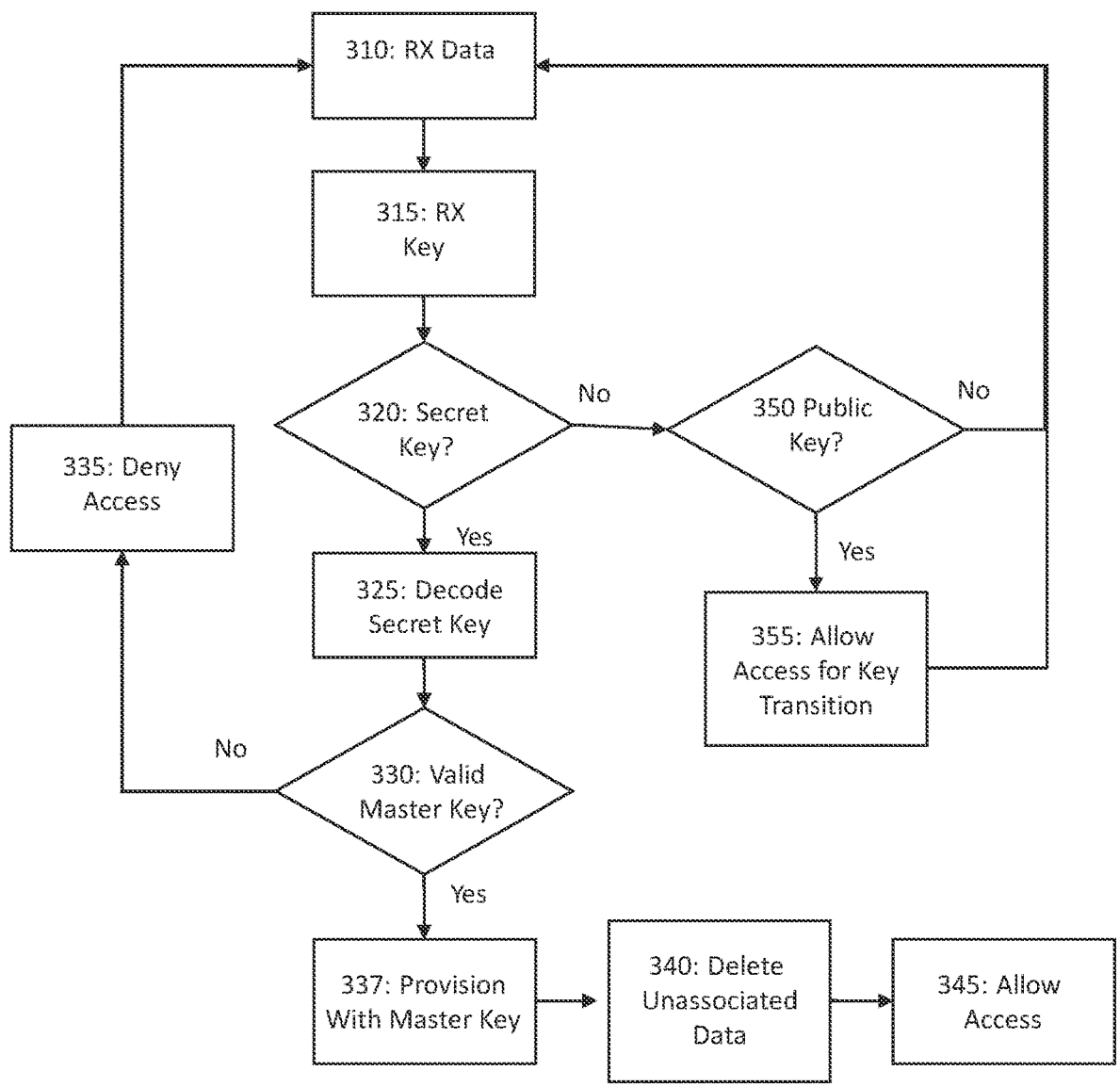
FIG. 3 shows a flow chart illustrating a method for providing an individually secure system to multiple distrusting parties according to an exemplary embodiment.

Turning now to FIG. 3, a flow chart illustrating a method 300 for providing an individually secure system to multiple parties according to an exemplary embodiment is shown. The exemplary method is configured to receive a secret key generated by a customer in response to a UID of the part and a master key associated with the part, decode the secret key to extract the master key, provision the part with the master key, delete information stored within the part not associated with the customer in response to the provisioning of the part with the decoded master key, and to provide access to provisioning controls of the part in response to the deletion of the information. The data may further include a default root public key for each potential customer.

The method is first operative to receive data 310 from a manufacturer of the part and to store the data in a memory. The data may include proprietary or confidential information for each of the potential customers of the part. The data may be supplied by the customer to the manufacturer before being provided to the part. In addition, the data may include a secret key for each of the potential customers wherein the secret key is generated by the manufacturer in response to an algorithm and a UID of the part and a master key associated with that part. Each of the secret keys are then stored in the memory. A default public key may also be included in the data and may also be stored in the memory. The default root public key may be used to transition the part to a customer's secret key but may not be used for software updates to prevent modification the software of the part, determination and/or use a secret key of another customer to determine security credentials used in that customer's ecosystem or for use of malware on a part that has valid security credentials for another customer's ecosystem.

The method is next operative to receive 315 a secret key via the interface. The secret key may be an alphanumeric string. The method then determines 320 if the key is a customer secret key. The key may be determined to be a secret key according to the format of the key, in response to other data received with the key, such as a data header or the like, or by comparing the key to stored secret keys. In addition, a provisioning record received with the secret key, or as a portion of the secret key, may include a parameter indicative the customer, or of a region that the part is being configured, such that the part may determine which of the stored customer keys is associated with the received secret keys. If the received key is determined to be a secret key, the method then decodes 325 the secret key using a customer key stored in a memory. If the secret key is not a match for a secret key stored in the memory, access is denied 335 and the method returns to waiting for additional data 310.

If the secret key is decoded using a customer key, the method next determines 330 if the decoded secret key results in a valid master key. If the decoded secret key is not valid master key, the method will deny 335 access to the part. If the decoded secret key is a valid master key, the method is configured to provision 337 the part with the master key and delete 340 all data associated with other customers that is stored in the memory or stored in the part. Data associated with the customer submitting the secret key is not deleted. After the other customer data has been deleted, the method then allows 345 access to the part by the approved customer. The approved customer may then reconfigure the part or integrate the part into a customer system.

If the decoded secret key is not determined 320 to be a valid master key, the method next determines 350 if the received key is a public key. If the received key is a public key, the method may then allow 355 access to the part for customer key transition or the like, but may not allow data within the part to be accessed or deleted, and may not allow software within the part to be updated, deleted or altered. The method the returns to await 310 the reception of subsequent data.

Figure 4:
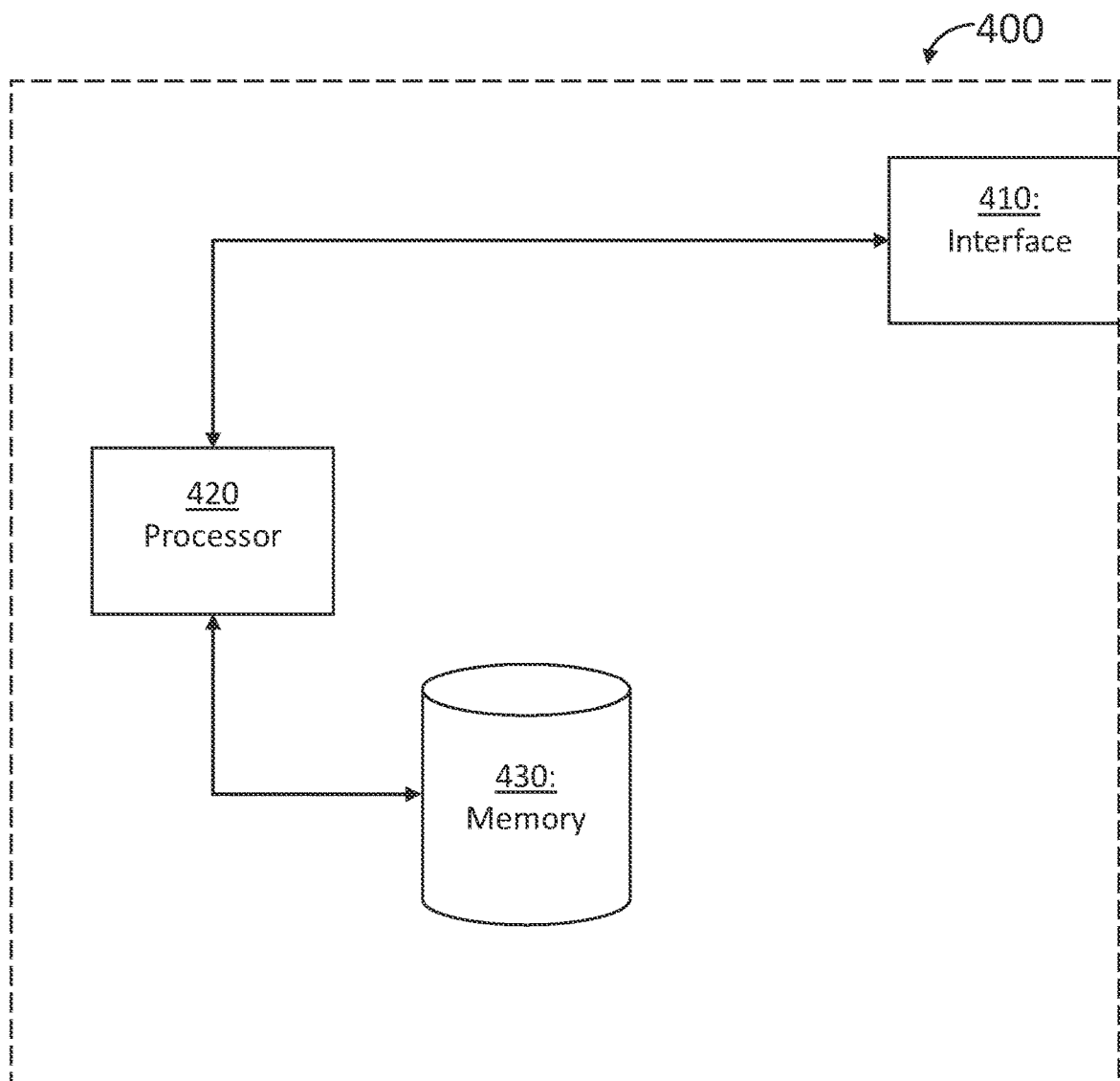
FIG. 4 shows a block diagram illustrating another system for providing an individually secure system to multiple distrusting parties according to another exemplary embodiment.

Turning now to FIG. 4, a diagram illustrating an exemplary embodiment of a secure controller 400 for providing an individually secure system to multiple parties is shown. The exemplary electronic control unit 400 may include a memory 410, a processor 420, and an interface 430. The secure controller 400 is configured for receiving a secret key from a customer generated in response to an algorithm associated with the customer and a UID of the secure controller. In this example, the secret key is a master key encoded by the algorithm in response to the UID. To provide secure access to the customer in order to provision the secure controller 400 according to the customer's ecosystem using a master key associated with the customer and without exposing other customer's proprietary information stored within a memory of the secure controller 400, the secure controller 400 is configured to delete any information associated with all other customers after a secret key from the customer is received and validated.

In this exemplary embodiment, the memory 410 is configured for storing a first customer key and a first data associated with a first customer and a second customer key and a second data associated with a second customer. For example, the first data may be a first security credential associated with a first customer system and the second data may be a second security credential associated with a second customer system. Alternatively, the first data may be a first provisioning data associated with a first customer ecosystem and the second data may be a second provisioning data associated with a second customer ecosystem. The first customer key and the second customer key may be generated by a supplier of the secure controller in response to the unique identifier of the secure controller and a first algorithm associated with the first customer and a second algorithm associated with the second customer. These keys may then be stored in the memory 410 by the supplier. For example, the first customer key may be stored in the memory and a secret key received from the customer via the interface 430 may be generated in response to a unique identifier of the secure controller 400, a master key associated with the first customer and an algorithm associated with the first customer.

The interface 430 may be a data port for receiving and transmitting data to a processor within the secure interface 400. The interface 430 may be a CAN bus interface, an ethernet port, a wireless network interface, or other data coupling port. In one exemplary embodiment, the interface 430 may be configured for receiving a secret key from the first customer after the secure controller has been delivered to the first customer by the supplier.

The secure controller 400 may further include a processor 420 for decoding the secret key in response to one of the first customer key and the second customer key for generating, decrypting or decoding a master key, for validating the master key, for deleting the second customer key and the second data in response to a provisioning of an electronic controller in response to the master key. The processor 420 may then allow additional access to the first data and or the electronic control unit in response to the provisioning of the electronic controller and/or additional security provisioning of the electronic controller. The processor 420 may be further operative to confirm the second data is deleted before allowing access to the first data. The processor 420 may be further configured to allow provisioning of security credentials for use by the secure controller in response to the provisioning of the electronic controller in response to the master key and/or deletion of the second customer key and second data. The interface 430 may be further configured for receiving a default unlock key associated with the first customer and wherein the processor 420 is further configured for altering the first key and not altering the first data, second data and second key in response to receiving the default unlock key.

In an exemplary embodiment, the secure controller 400 may be a vehicle ECU including a memory configured for storing a first customer key associated with a first customer, a first provisioning data associated with the first customer, a second customer key associate with a second customer and a second provisioning data associated with the second customer, a network interface configured for receiving a received key, and a processor configured to decode the received key to generate a master key, to delete the second provisioning data and the second secret key in response to the generation of the master key and for provisioning the vehicle electronic control unit in response to the master key and the first provisioning data in response to the deletion of the second provisioning data and the second secret key. In one example, the first customer key and the received key may be generated in response to a unique identifier of vehicle electronic control unit using an algorithm associated with the first customer.

Figure 5:
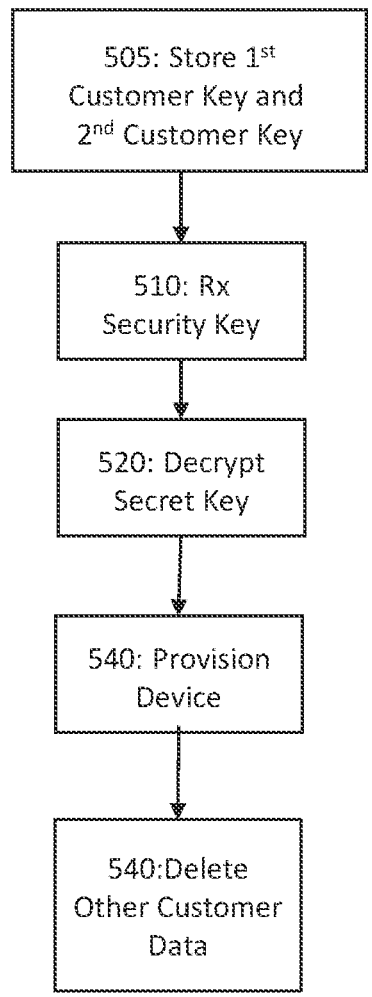
FIG. 5 shows a flow chart illustrating another method for providing an individually secure system to multiple distrusting parties according to another exemplary embodiment.

Turning now to FIG. 5, a flow chart illustrating an exemplary implementation of a method 500 for intelligent wireless protocol optimization is shown. The method is first operative for storing 505, in a memory, a first customer key and a second customer key. The first customer key and the second customer may be generated by a supplier of a device using an algorithm or process unique to each customer and private to that customer in response to a UID of the device.

The method is next configured for receiving 510, by a processor, a secret key. The secret key may be received by a data interface, such as a controller area network interface. The secret key may be generated by the customer in response to a master key and to a UID of a device, such as an ECU using an algorithm unique to each potential customer. Thus, a secret generated for each customer using the device UID and a unique algorithm for each customer would generate unique security keys for each customer and each device.

The method is next operative for decrypting 520, by the processor, the secret key using a first customer key stored in a memory within the device to extract a master key. In this exemplary embodiment, the first secret key and the second secret key are generated by a supplier of the device in response to the UID of the device and unique algorithm for each customer and are stored in a memory within the device by the supplier. The method is next configured for provisioning 530, by the processor, an electronic control unit in response to the master key. Provisioning in response to the master key may enable communications between other components within the system according to a customer's ecosystem.

In response to a provisioning in response to the master key, the method next deletes 540, by the processor, the second customer key in response to the provisioning of electronic control unit in response to the master key. In this exemplary embodiment, the first provisioning data and the first customer key are associated with a first customer and the second provisioning data and the second customer key are associated with a second customer. All data stored associated with any other customer, other than the first customer, may be deleted in response to the first customer providing a secret key resulting in a valid master key to the device interface in order to maintain the confidentiality of the other customer's intellectual property and the security of their ecosystem.

The method is next configured for provisioning 550, by the processor, the device, such as an ECU, in response to the first provisioning data and the deletion of the second customer key and the second provisioning data. The processor may be configured to allow provisioning of a security credential for use by the ECU using the first provisioning data in response to the secret key being decoded to generate a valid master key. In one example, the provisioning of the electronic control unit in response to the first provisioning data may be performed in response to a confirmation, by the processor, of the deletion of the second customer key and the second provisioning data to ensure confidentiality of the other second customer data.

In one exemplary embodiment, the method may be further operative for receiving a default unlock key associated with a first customer and wherein the processor is further configured for altering the first customer key and not altering the first provisioning data, the second provisioning data and second customer key in response to receiving the default unlock key. In addition, the first provisioning data is a first security credential associated with a first customer system and wherein the second provisioning data is a second security credential associated with a second customer system. The security credentials may be used for communications on a secure network, such as a CAN bus network or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   storing, in a memory in an electronic control unit, a first customer key and a second customer key;
   receiving, by a processor in the electronic control unit, a secret key from a first customer;
   decrypting, by the processor, the secret key using the first customer key to extract a master key;
   provisioning, by the processor, the electronic control unit in response to the master key; and
   deleting, by the processor, the second customer key to prevent modification of software not associated with a first customer in response to the provisioning of the electronic control unit in response to the master key and to confirm the second data is deleted before allowing a software update of the electronic control unit.

2. The method of claim 1, wherein the first customer key and the secret key are generated in response to a unique identifier of the electronic control unit using an algorithm associated with the first customer.

3. The method of claim 1, wherein the secret key is received at a controller area network interface.

4. The method of claim 1, wherein the second customer key is associated with a second customer.

5. The method of claim 1, wherein a further provisioning of the electronic control unit is performed in response to a confirmation, by the processor, of the deletion of the second customer key.

6. The method of claim 1, wherein the processor is further configured to allow provisioning of a security credential for use by the electronic control unit in response to the master key.

7. The method of claim 1, wherein the master key is a first security credential associated with the first customer.

8. The method of claim 1, wherein the first customer key and the second customer key are generated by a supplier of the electronic control unit in response to a unique identifier of the electronic control unit and are stored in the memory by the supplier.

9. The method of claim 1, wherein the first customer key and the second customer key are generated by a supplier of the electronic control unit during a manufacturing of the electronic control unit.

10. A secure controller comprising:
    a memory in an electronic control unit configured for storing a first key and a first data associated with a first customer and a second key and a second data associated with a second customer;

an interface communicatively coupled to the electronic control unit for receiving a received key from the first customer; and a processor for decrypting the received key using the first key to generate a master key, for provisioning the electronic control unit in response to the master key, for deleting the second key and the second data in response to the provisioning of the electronic control unit in response to the master key to prevent modification of software not associated with the first customer, and to confirm the second data is deleted before allowing a software update of the electronic control unit.

11. The secure controller of claim 10, wherein the first key and the received key are generated in response to a unique identifier of the secure controller using an algorithm associated with the first customer.

12. The secure controller of claim 10, wherein the interface is a controller area network interface.

13. The secure controller of claim 10, wherein the second data is a control algorithm associated with an ecosystem of the second customer.

14. The secure controller of claim 10, wherein the processor is further configured to allow provisioning of security credentials for use by the secure controller in response to the master key.

15. The secure controller of claim 10, wherein the first data is a first security credential associated with a first customer system and wherein the second data is a second security credential associated with a second customer system.

16. The secure controller of claim 10, wherein the first key and the second key are generated by a supplier of the secure controller in response to a unique identifier of the secure controller and are stored in the memory by the supplier.

17. The secure controller of claim 10, wherein the first key and the second key are generated by a supplier of the electronic control unit during a manufacturing of the electronic control unit.

18. A vehicle electronic control unit comprising:

a memory configured for storing a first customer key associated with a first customer, a first provisioning data associated with the first customer, a second customer key associate with a second customer and a second provisioning data associated with the second customer;

a network interface configured for receiving a received key from the first customer; and a processor configured to decode the received key to generate a master key, to delete the second provisioning data and the second customer key in response to the generation of the master key to prevent modification of software not associated with the first customer, and for provisioning the vehicle electronic control unit in response to the master key and the first provisioning data in response to the deletion of the second provisioning data and the second customer key and to confirm the second data is deleted before allowing a software update of the electronic control unit.

19. The vehicle electronic control unit of claim 18, wherein the first customer key and the received key are generated in response to a unique identifier of vehicle electronic control unit using an algorithm associated with the first customer.

\* \* \* \* \*